United States Patent
Möck et al.

(10) Patent No.: US 8,669,336 B2
(45) Date of Patent: Mar. 11, 2014

(54) FLUORO LEVELLING AGENTS

(75) Inventors: Andreas Möck, Rheinfelden (DE); Ralf Knischka, Neustadt (DE); Clemens Auschra, Freiburg (DE)

(73) Assignee: BASF SE, Ludwigshafen (DE)

( * ) Notice: Subject to any disclaimer, the term of this patent is extended or adjusted under 35 U.S.C. 154(b) by 135 days.

(21) Appl. No.: 12/867,770

(22) PCT Filed: Feb. 3, 2009

(86) PCT No.: PCT/EP2009/051180
§ 371 (c)(1),
(2), (4) Date: Nov. 3, 2010

(87) PCT Pub. No.: WO2009/103613
PCT Pub. Date: Aug. 27, 2009

(65) Prior Publication Data
US 2011/0040018 A1    Feb. 17, 2011

(30) Foreign Application Priority Data
Feb. 22, 2008   (EP) .................................... 08151780

(51) Int. Cl.
*C08F 18/20* (2006.01)

(52) U.S. Cl.
USPC ........... 526/245; 525/199; 525/200; 526/204; 526/217; 526/220; 526/242; 528/401

(58) Field of Classification Search
USPC .......... 525/199, 200; 526/204, 217, 220, 242, 526/245; 528/401
See application file for complete search history.

(56) References Cited

U.S. PATENT DOCUMENTS

| | | | |
|---|---|---|---|
| 4,112,190 A * | 9/1978 | Sato et al. ..................... | 428/457 |
| 2003/0105236 A1 | 6/2003 | Hobische et al. | |
| 2008/0280070 A1 * | 11/2008 | Knischka et al. ............. | 427/595 |

FOREIGN PATENT DOCUMENTS

| | | |
|---|---|---|
| EP | 1316592 A1 | 6/2003 |
| EP | 1333072 A2 | 8/2003 |
| EP | 1642947 | 4/2006 |
| JP | 2007-191507 | 8/2007 |
| WO | 03027155 A1 | 4/2003 |
| WO | 03027159 A2 | 4/2003 |
| WO | 2005059048 A1 | 6/2005 |

OTHER PUBLICATIONS

INEOS Oxide, "Methoxy Polyethylene Glycols", Technical Data Sheet, Jan. 2004, p. 1-4.*
The Dow Chemical Company, "CARBOWAX Methoxypolyethylene Glycol (MPEG) 350", Technical Data Sheet, Dec. 2011, pp. 1-2.
Partial English language translation for JP2007-191507 (8 pages); 2007.

* cited by examiner

*Primary Examiner* — Robert Jones, Jr.
(74) *Attorney, Agent, or Firm* — Shruti Costales

(57) ABSTRACT

The invention relates to a coating composition comprising short chain fluorinated acrylates and to the use of short chain fluorinated acrylates as levelling agents for pigmented and unpigmented coating compositions. The coating composition comprises a) a film forming binder resin, and b) a copolymer made by controlled polymerization or by conventional radical polymerization comprising a monomer ($M1_x$) selected from unsaturated monomers out of the group of (meth)acrylates, styrenic monomers or (meth)acrylamides whereby the copolymer contains at least >30 wt % (meth)acrylates; and a monomer ($M2_y$) selected from $C_1$-$C_4$-fluoralkyl(meth)acrylates; x denotes the total number of monomers M1 within the structural element ($M1_x$): x>5, preferred, 10-1000, most preferred, 10-500; y denotes the total number of monomers M2 within the structural element ($M2_y$): y>1, preferred, 2-20, most preferred 2-10; c) optional other conventional coating components and/or additives.

9 Claims, No Drawings

FLUORO LEVELLING AGENTS

The invention relates to a coating composition comprising short chain fluorinated acrylates and to the use of short chain fluorinated acrylates as levelling agents for pigmented and unpigmented coating compositions.

Smooth and crater free surfaces are important for many coating applications. This is not only due to visual aspects but also the protective issue of a surface coating. In the case the coating is not homogenous and some parts of the surface are not or only very thinly coated then the protection is also low. Therefore levelling agents are applied as additives in all sorts of coatings. In the case of liquid coating formulations a large number of levelling agents is on the market to come to very smooth coating surfaces. For liquid coating formulations the problems of levelling are also not that strong as there is due to the low viscosity enough time for a good levelling of the coating surface. Large problems can be observed in the case of high solids coatings or even powder coatings as in these cases higher viscous liquids or melts are applied. Especially in the case of thermally and radiation curable powder coatings a strong demand for agents to improve the levelling of the coating can be observed.

There are various different materials available on the market for all kinds of coatings including powder coatings. But there is still a need for improved levelling agents, which offer a different and improved balance of properties e.g. with respect to levelling performance, yellowing tendency and handling characteristics.

One aspect of the invention is the synthesis of such materials with special methods of controlled free radical polymerisation. Controlled free radical polymerisation means in this case firstly nitroxide mediated controlled free radical polymerisation (NOR), atom transfer free radical (ATRP), and reversible addition fragmentation chain transfer (RAFT). Linear, branched and graft structures of various monomers like acrylate/methacrylate monomers can be used. Controlled free radical polymerisation allows the synthesis of such materials with significantly reduced molecular weight distribution.

Some levelling agents on the market contain fluorinated parts, usually based on monomers with perfluoro groups of average chain length larger than 4, typically minimum 6 to 8 (see for example the Zonyl-monomers from Du Pont or Fluorad monomers from 3M: Zonyl TA-N($C_8$-$C_{12}$ perfluoro group), Zonyl TM ($C_6$-$C_{12}$ perfluoro group), Fluorad FX-189 (average perfluoro chain length=8) It is well-known that such long chain perfluoro-groups built into copolymers provide additives which show good surface activity by lowering the surface tension of the liquid paint as well as in the curing stage of the paint film. (Example: WO03027155 (PPG); WO0327159 (PPG); EP1316592 (Solutia)). Long chain perfluoro chemicals with typical perfluoro chain length of C8 are known to form environmentally very persistent degradation products like perfluoro-octanoic acid (PFOA). Recent environmental concerns by U.S., European and Asian regulatory authorities on fluorine-based polymeric products that contain or biodegrade to perfluoro-octanoic acid (PFOA), and the subsequent removal of many of these products from the market, have created a definite need for environmental friendly alternatives. One option is the use of fluorochemicals based on fluorinated short carbon chains (C1 to C3). So far short chain fluorinated acrylates or methacrylates have not found use for the synthesis of levelling agents, because it is believed that the short chain fluoro groups do not provide high efficiency in reducing the surface tension of corresponding copolymers. Unexpectedly, we found that acrylic copolymers which contain rather low levels of short chain fluoro groups, show good performance as levelling agents for coatings.

A further aspect of the invention is the significantly reduced discoloration of the coatings after the application using these materials. Many commercially available materials show especially in polyester/primid-coating systems strong discoloration.

WO 2005 059048 (Ciba,) describes coating compositions containing levelling agents of formula In-[$(M)_x$-$(E)_y$]$_n$ prepared by nitroxyl mediated controlled polymerization. M is a monomer that may be substituted by fluoro or perfluoro. An example is given for Zonyl-TM=2-(perfluoroalkyl)ethyl methacrylate. WO 2005 059048 does not give any hint to short chain fluorinated acrylates.

Thus, the invention relates to a coating comprising:
a) a film forming binder resin, and
b) a copolymer made by controlled polymerisation or by radical polymerisation comprising a monomer ($M1_x$) selected from unsaturated monomers out of the group of (meth)acrylates, styrenic monomers or (meth)acrylamides, whereby the copolymer contains at least >30 wt % (meth)acrylates; and
a monomer ($M2_y$) selected from $C_1$-$C_4$-fluoralkyl(meth)acrylates;
x denotes the total number of monomers M1 within the structural element ($M1_x$): x>5, preferred, 10-1000, most preferred, 10-500;
y denotes the total number of monomers M2 within the structural element ($M2_y$): y>1, preferred, 2-20, most preferred 2-10.

Optional other conventional coating components and/or additives are present.

Bracket always denotes acrylates and/or methacrylates.

Within the structural element ($M1_x$), all possible polymer chain structures are comprised e.g. linear or branched. If the monomers M1 are selected from chemically different monomers, all possible monomer sequence structures are comprised within the structural element ($M1_x$): e.g. random-, block like, multiblock-, tapered-arrangement of the different monomers.

Within the structural element ($M2_y$), all possible polymer chain structures are comprised e.g. linear or branched.

Between the two structural elements ($M1_x$) and ($M2_y$), all possible monomer sequence structures are comprised: e.g. random-, block like, multiblock-, tapered-arrangement of the different monomers.

M1 is preferably selected from: $C_1$-$C_{18}$ (meth)acrylates, especially methyl(meth)acrylate (MMA), ethyl(meth)acrylate, n-butyl(meth)acrylate, iso-butyl(meth)acrylate, t-butyl (meth)-acrylate, 2-ethylhexyl(meth)acrylate, isodecyl(meth)acrylate, hydroxyfunctional (meth)-acrylates like 2-hydroxyethyl(meth)acrylate, hydroxypropyl(meth)acrylate, acid functional (meth)acrylic monomers like acrylic acid or methacrylic acid, sulphonic acid containing monomers like 2-acrylamido-2-methylpropane sulfonic acid (AMPS), aminofunctional (meth)acrylates like dimethylaminoethylmethacrylate (DMAEMA), epoxy functional (meth)acrylates like glycidylmethacrylate (GMA), (meth)acrylates containing siloxane groups.

M2 is selected from: $C_1$-$C_4$-fluoralkyl(meth)acrylates; preferably 2,2,2-trifluoroethyl (meth)-acrylate, 2,2,3,3,3-pentafluoropopyl (meth)acrylate, 2,2,3,4,4,4-hexafluorobutyl (meth)-acrylate, most preferred 2,2,2-trifluoroethyl (meth)acrylate.

The copolymer comprises at least 30% wt (meth)acrylate monomers M1, preferred at least 45% wt, most preferred at least 60% wt (meth)acrylate monomers.

Preferably the copolymer is composed of at least 30% by weight of tert.-butylacrylate and/or tert.-butylmethacrylate, based on the weight of total monomers.

In one embodiment the polymer is obtained by conventional radical polymerisation by reacting M1 with M2 in the presence of a free radical initiator selected from inorganic and organic peroxides, hydroperoxides, persulfates, azo compounds such as azobisisobutyronitrile (AIBN) (Claim 2)

In one embodiment the polymer is produced by controlled polymerisation. (Claim 3)

Examples of controlled polymerizations are:
Group transfer polymerisation (GTP) as described, for example, in U.S. Pat. No. 4,656,226.
The reversible addition-fragmentation chain transfer polymerisation RAFT using chain transfer agents which react by reversible addition—fragmentation chain transfer as described, for example, in WO-A-98/01478, WO-A-99/05099 or WO-A-99/31144
Atom transfer radical polymerisation (ATRP) as, for example, described in WO96/30421
Polymerization in the presence of alkoxyamine initiator/regulator compounds as described, for example, in U.S. Pat. No. 4,581,429 or EP-A-0 621 878 or Polymerization in the presence of a stable nitroxyl free radical and a radical initiator (source of free radicals) as described, for example, in WO-A-94/11412. (nitroxide mediated controlled polymerisation).

RAFT describes a method of polymer synthesis by radical polymerization in the presence of a free radical source and using chain transfer agents which react by reversible addition-fragmentation chain transfer. The chain transfer agent is, for example,
2-phenylprop-2-yl dithiobenzoate (Ph-C(CH$_3$,CH$_3$)—S—C(S)-Ph) or benzyl dithioacetate Ph-CH$_2$—S—C(S)—CH$_3$ as described in WO-A-98/01478, or
a carbamates such as, for example, benzyl 1-pyrrolecarbodithioate

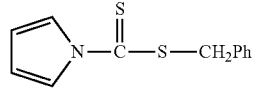

as described in WO99/31144; or
alkylxanthates such as, for example, ethyl α(O-ethylxanthyl propionate) as described in WO 98/58974

WO 96/30421 (K. Matyjaszewski) discloses a controlled polymerisation process of ethylenically unsaturated polymers, such as styrene or (meth)acrylates, by employing the Atomic Transfer Radical Polymerisation (ATRP) method. This method produces defined oligomeric homopolymers and copolymers, including block copolymers. Initiators are employed, which generate radical atoms, such as .Cl, in the presence of a redox system of transition metals of different oxidation states, e.g. Cu(I) and Cu(II), providing "living" or controlled radical polymerisation.

Preferred is nitroxide mediated controlled polymerisation.

In a preferred embodiment the invention refers to a coating composition comprising:
a) film forming binder resin, and
b) a copolymer made by nitroxide mediated controlled polymerisation of the formula I $$In-[(M1_x-M2_y)-(E)_z]_n \qquad I$$

c) optional other conventional coating components and/or additives;
wherein
M1 is selected from unsaturated monomers out of the group of (meth)acrylates, styrenic monomers or (meth)acrylamides whereby the copolymer contains at least >30 wt % (meth)acrylates; and x denotes the total number of monomers M1 within the structural element (M1$_x$): x>5, preferred, 10-1000, most preferred, 10-500, M2 is selected from C$_1$-C$_4$-fluoralkyl(meth)acrylates, y denotes the total number of monomers M2 within the structural element (M2$_y$): y>1, preferred, 2-20, most preferred, 2-10, In initiator fragment capable to initiate radical polymerisation, E is a group bearing at least one stable free nitroxyl radical, which is bound via the oxygen atom to the polymer or copolymer; or a group which results from a substitution or elimination reaction of the attached stable free nitroxyl radical;

z=≥1 n=1 to 20. (claim 4)

Preferences

Preferably in formula I z is 1.

Preferably the copolymer b) is a linear polymer or copolymer of the formula (I) with n=1. (claim 5)

The Initiator IN-E

All the initiators

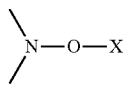

as disclosed in WO 2005 059048 are suitable.

E-In is preferably of formula A, B or O,

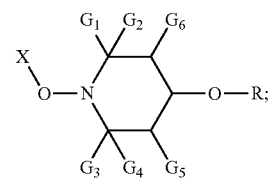

(A)

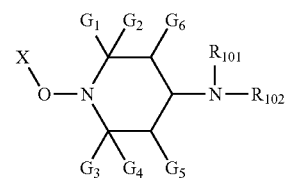

(B)

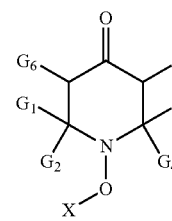

(O)

wherein

R is hydrogen, C$_1$-C$_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl;

$G_6$ is hydrogen, $G_5$ is hydrogen or $C_1$-$C_4$alkyl, $G_1$ and $G_3$ are methyl, $G_2$ and $G_4$ are ethyl or propyl or $G_1$ and $G_2$ are methyl and $G_3$ and $G_4$ are ethyl or propyl; and X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

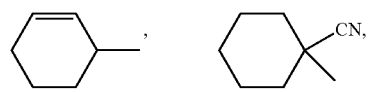

—CH$_2$CH═CH$_2$, CH$_3$CH—CH═CH$_2$ (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl. (claim 7)

The above compounds and their preparation are described in GB 2 335 190 and GB 2 361 235.

Preferred initiators are:

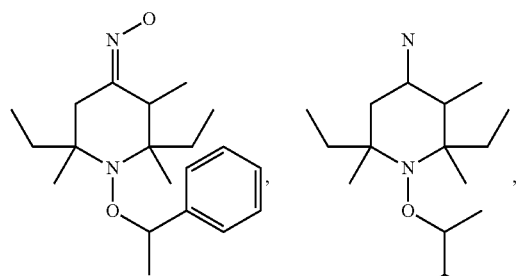

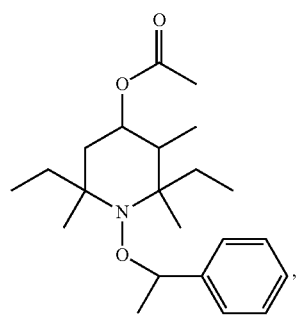

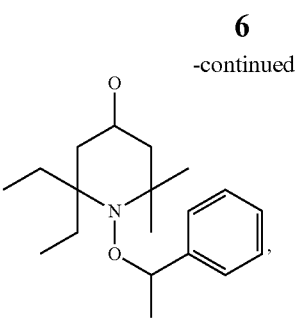

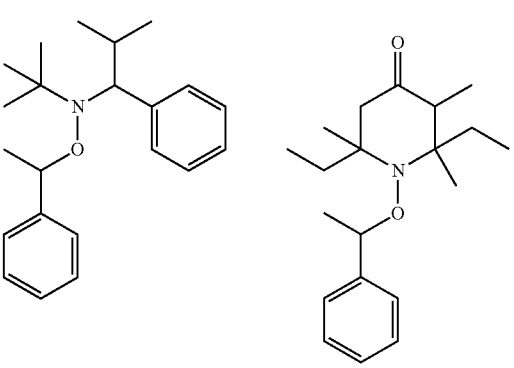

An especially preferred Initiator is

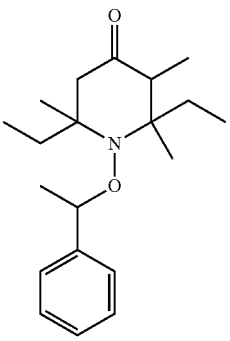 [SMILES: CCC1(C)CC(=O)C(C)C(C)(CC)N1OC(C)c1ccccc1]

In this case the initiating fragment (In) in formula (I) is

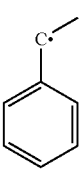

and the group (E) is

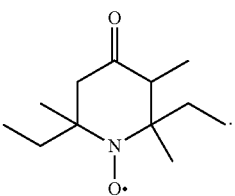

The initiator IN-E comprises the nitroxyl radical E and the initiator fragment In and is derived from the polymerisation reaction which is nitroxyl mediated controlled polymerization.

There are essentially two suitable routes:
b1) polymerization in the presence of alkoxyamine initiator/regulator compounds having the structural element

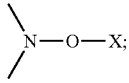

and
b2) polymerization in the presence of a stable nitroxyl free radical having the structural element

and a radical initiator (source of free radicals). Claim 8

The structural element

is for example

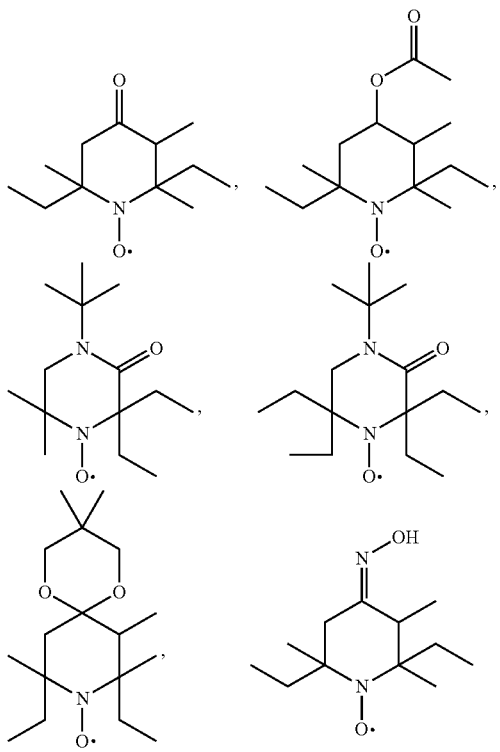

The initiator IN-E may also be derived from Atom transfer radical polymerization (ATRP).

Thus, a further aspect of the invention is a coating composition comprising
a) film forming binder resin, and
b) a copolymer made by controlled ATRP polymerisation having the structure:

$$X-[(M1_x\text{-}M2_y)\text{-}(Y)_z]_n$$

c) optional other conventional coating components and/or additives
wherein
M1 is selected from unsaturated monomers out of the group of (meth)acrylates, styrenic monomers or (meth)acrylamides, whereby the copolymer contains at least >30 wt % (meth)acrylates; and
x denotes the total number of monomers M1 within the structural element ($M1_x$): x>5, preferred, 10-1000, most preferred, 10-500,
M2 is selected from $C_1$-$C_4$-fluoralkyl(meth)acrylates,
y denotes the total number of monomers M2 within the structural element ($M2_y$): y>1, preferred, 2-20, most preferred, 2-10,
X is the initiator fragment starting the ATRP polymerisation reaction;
Y is Cl, Br or a group introduced by nucleophilic substitution of Cl or Br;
z=≥1
n=1 to 20. (claim 9)

Atom transfer radical polymerization (ATRP) is, for example, described in WO 96/30421. WO 96/30421 discloses a controlled or "living" polymerization process of ethylenically un-saturated monomers such as styrene or (meth)acrylates by employing the ATRP method. According to this method initiators are employed which generate a radical atom such as .Cl, in the presence of a redox system of transition metals of different oxidation states, e.g. Cu(I) and Cu(II), providing "living" or controlled radical polymerization.

A suitable initiating compound is of formula (XI), $[X\!\!-\!\!]_p$ $[Hal]_q$ (XI) with a radically transferable atom or group .Hal as is described in WO 96/30421 and WO 98/01480. A preferred radically transferable atom or group .Hal is .Cl or .Br, which is cleaved as a radical from the initiator molecule.

X represents the fragment of a polymerisation initiator preferably selected from the group consisting of $C_1$-$C_8$ alkyl halides, $C_6$-$C_{15}$ aralkyl halides, $C_2$-$C_8$-haloalkyl esters, arene sulphonyl halides, alpha-haloalkane nitriles and halolactones.

More preferred initiators include 1-phenylethyl chloride, 1-phenylethyl bromide, methyl 2-chloropropionate, ethyl 2-chloropropionate, methyl 2-bromopropionate, ethyl 2-bromoiso-butyrate, α,α'-dichloroxylene, α,α'-dibromoxylene and hexakis(α-bromomethyl)benzene.

The ATRP polymers are prepared according to WO9630421 by a process comprising the steps of polymerizing M1 and M2 in the presence of an initiator as described above and in the presence of a transition metal compound, for example CuCl, and a ligand, for example bipyridine) to form a copolymer.

The CuCl as a Model Catalyst and Bipyridine

The film forming binder a) is selected from:
Solvent based resins, water based resins, emulsion polymers, solution polymers. The resins comprise all kinds of crosslinking mechanism and coating systems based on 1 component (1p) as well as 2p and multi component systems, e.g. thermosetting resins, room temperature curable resins, radiation-curable resins. Also included are physically drying coating systems like thermoplastic acrylic resins.

The resins comprise state of the art polymer chemistry used in coatings: e.g. saturated poly-esters, unsaturated polyesters, polyacrylates, styrene-acrylic resins, polyurethanes, epoxy resins, nitrocellulose resins, hybrid systems like polyester/ polyurethanes, polyacrylate/poly-urethanes, alkyd/melamine, polyester/CAB/melamine, polyacrylate/CAB/melamine, etc.

Most preferred resins a) comprise powder coating resins, i.e. resin systems which are solid at room temperature and do not include a liquid carrier, e.g. thermosetting powder coatings or radiation curable powder coatings like polyester/PRIMID, polyester/TGIC, epoxyfunctional polyacrylates with acidic crosslinker components, etc.

The Levelling Agent Polymer b)

Preferably, the levelling agent polymer b) is used in combination with a solid carrier i.e. silica powder, high molecular waxes or in-house solid levelling agents to obtain non-dusting storage stable powders or pellets.

Preferred levelling agent polymers b) are linear polymers, i.e. with n=1, with molecular weight Mn=1,000-100,000, more preferred 3,000-50,000.

Preferred levelling agent polymers b) contain monomers (M2) with short fluorinated chains (C1 to C4) in amounts of 0.5-20% wt, more preferred 1-10% wt.

The amount of levelling agent polymer b) is 0, 1-15%, more preferred 0, 1-10%, most preferred 0, 1-3% relative to total binder a)

The used monomers t-butylacrylate (t-BA), n-butylacrylate (n-BA), 2-ethylhexyl acrylate (EHA), 2,2,2-trifluoroethyl methacrylate (TFEMA), 2,2,3,3,3-pentafluoropopyl methacrylate (PFPMA) and 2,2,3,4,4,4 hexafluorobutyl methacrylate (HFBMA) are commercially available monomers.

The used solvent ethylhexyl acetate is also a commercially available compound.

The levelling agent b) may be used in all kind of coating systems.

Preferred are powder coatings, high solid coating, radiation curable coating or water based coating.

Conventional coating components and/or additives are pigments; crosslinking agents; commercial levelling agents; photoinitiators; photosensitizers; degassing agents; optical brighteners; benzoin; flow modifiers; anti-blocking agents; ultraviolet absorbers; antistatic agents; antioxidants; agents to improve scratch resistance and the like.

The invention further relates to a process for improving the levelling of a coating composition according to claim 1, which process comprises applying the coating composition to a substrate and exposing it to thermal energy or electromagnetic radiation in order to obtain a homogenous solid coating.

Thus, the invention also relates to the use of a copolymer of formula (I) as defined in claim 1 as a levelling agent for pigmented and unpigmented coating compositions.

The invention is further explained by the examples

EXAMPLE 1

Synthesis of a Linear Block-Copolymer of n-Butylacrylate (nBA) and 2,2,2-Trifluoroethyl meth-acrylate (TFEMA)—MOE 3044.1

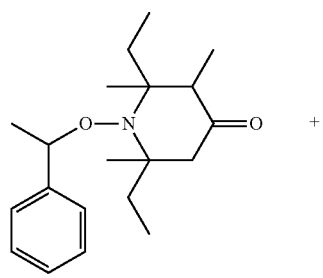

CGPS 345
[MW 317.48]

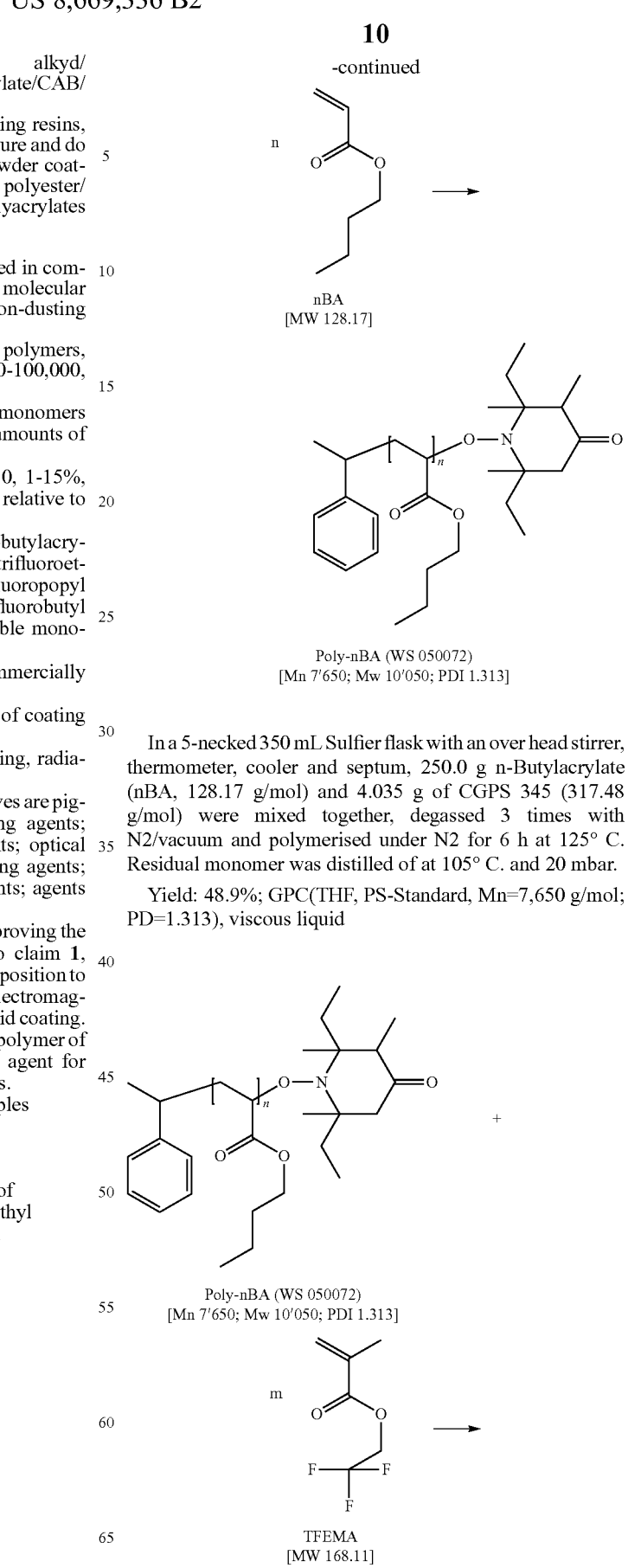

In a 5-necked 350 mL Sulfier flask with an over head stirrer, thermometer, cooler and septum, 250.0 g n-Butylacrylate (nBA, 128.17 g/mol) and 4.035 g of CGPS 345 (317.48 g/mol) were mixed together, degassed 3 times with N2/vacuum and polymerised under N2 for 6 h at 125° C. Residual monomer was distilled of at 105° C. and 20 mbar.

Yield: 48.9%; GPC(THF, PS-Standard, Mn=7,650 g/mol; PD=1.313), viscous liquid

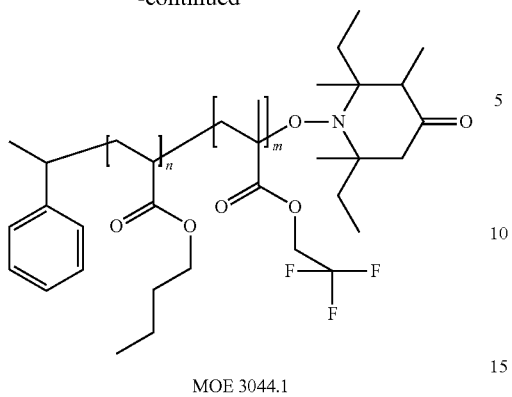

MOE 3044.1
[Mn 8'170; Mw 10'720; PDI 1.312]

In a 100 mL steel autoclave 40 g of Poly-nBA (WS 050072; Mn 7,650 g/mol) and 6.81 g of 2,2,2-Trifluoroethyl methacrylate (TFEMA; 168.11 g/mol) were mixed together, degassed 5 times with Argon/vacuum and polymerised for 4 h at 145° C. During this time the pressure in the autoclave didn't exceed 2 bar. Residual monomer was distilled of at 105° C. and 20 mbar.

Yield: 45%; GPC(THF, PS-Standard, Mn=8,170 g/mol; PD=1.312), viscous liquid.

EXAMPLE 2

Synthesis of a Linear Block Copolymer of n-Butylacrylate (nBA) and 2,2,3,3,3-Pentafluoro-popyl methacrylate (PFPMA)—MOE 3040.2

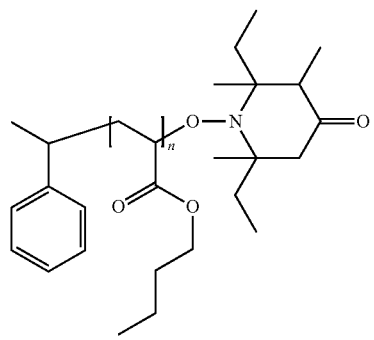

Poly-nBA (WS 050072)
[Mn 7'650; Mw 10'050; PDI 1.313]] +

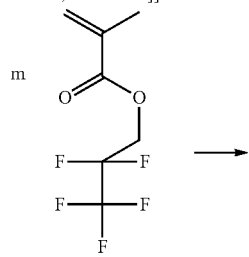

PFPMA
[MW 218.12]

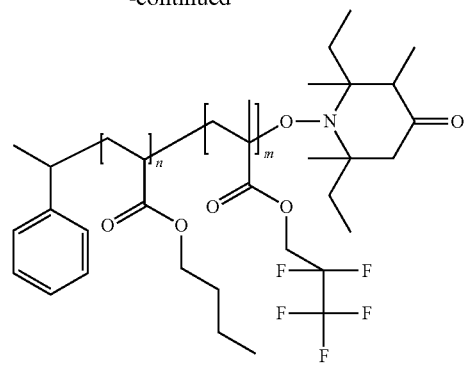

MOE 3040.2
[Mn 8'720; Mw 11'260; PDI 1.292]

The poly-n BA is prepared according to Example 1.

In a 3-necked 250 mL round bottom flask with an over head stirrer, thermometer and cooler, 60 g of Poly-nBA (WS 050072; Mn 7,650 g/mol), 13.31 g of 2,2,3,3,3-Pentafluoropropyl-methacrylat (PFPMA; 218.12 g/mol) and 30 g of Ethylhexyl acetate were mixed together, degassed 3 times with N2/vacuum and polymerised under N2 atmosphere for 5 h at 135° C. Residual monomer and solvent were distilled of at 120° C. and 10 mbar.

Yield: 41%; GPC(THF, PS-Standard, Mn=8,720 g/mol; PD=1.292), viscous liquid

EXAMPLE 3

Synthesis of a Linear Block-Copolymer of n-Butylacrylate (nBA) and 2,2,3,4,4,4 Hexafluoro-butylmethacrylat (HFBMA)—MOE 3041.2

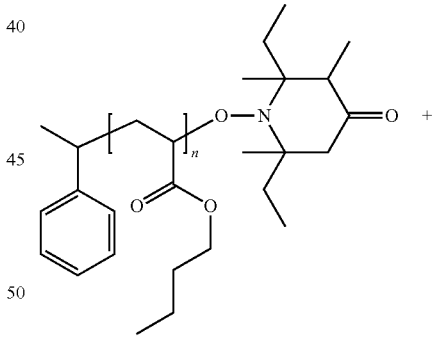

Poly-nBA (WS 050072)
[Mn 7'650; Mw 10'050; PDI 1.313] +

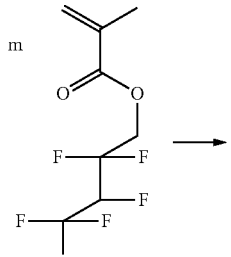

HFBMA
[MW 250.14]

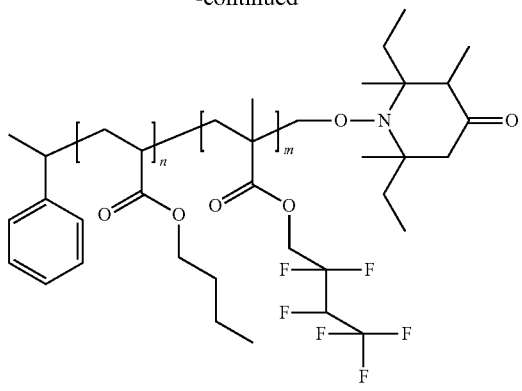

MOE 3041.2
[Mn 10'360; Mw 14'310; PDI 1.38]

The poly-n BA is prepared according to Example 1.

In a 3-necked 250 mL round bottom flask with an over head stirrer, thermometer and cooler, 60 g of Poly-nBA (WS 050072; Mn 7'650 g/mol), 15.26 g of 2,2,3,4,4,4 hexafluorobutylmeth-acrylat (HFBMA; 250.14 g/mol) and 30 g of Ethylhexyl acetate were mixed together, degassed 3 times with N2/vacuum and polymerised under N2 atmosphere for 5 h at 135° C. Residual monomer and solvent were distilled of at 120° C. and 10 mbar.

Yield: 42%; GPC(THF, PS-Standard, Mn=10'360 g/mol; PD=1.38), viscous liquid

EXAMPLE 4

Synthesis of a Linear Block-Copolymer of tert-Butylacrylate (tBA) and 2,2,2-Trifluoroethyl methacrylate (TFEMA)—MOE 3039.1

In a 5-necked 500 mL Sulfier flask with an over head stirrer, thermometer, cooler and septum, 300.0 g tert-Butylacrylate (tBA, 128.17 g/mol) and 7.716 g of CGPS 345 (317.48 g/mol) were mixed together, degassed 3 times with N2/vacuum and polymerised under N2 for 12 h at 115° C. Residual monomer was distilled of at 105° C. and 20 mbar.

Yield: 61%; GPC(THF, PS-Standard, Mn=7,150 g/mol; PD=1.32), solid

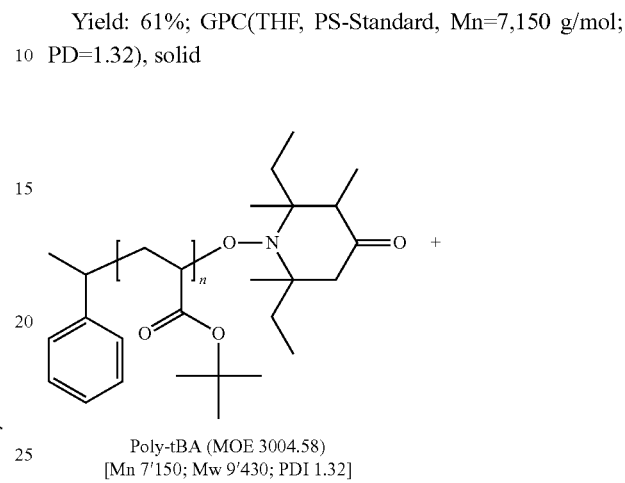

Poly-tBA (MOE 3004.58)
[Mn 7'150; Mw 9'430; PDI 1.32]

TFEMA
[MW 168.11]

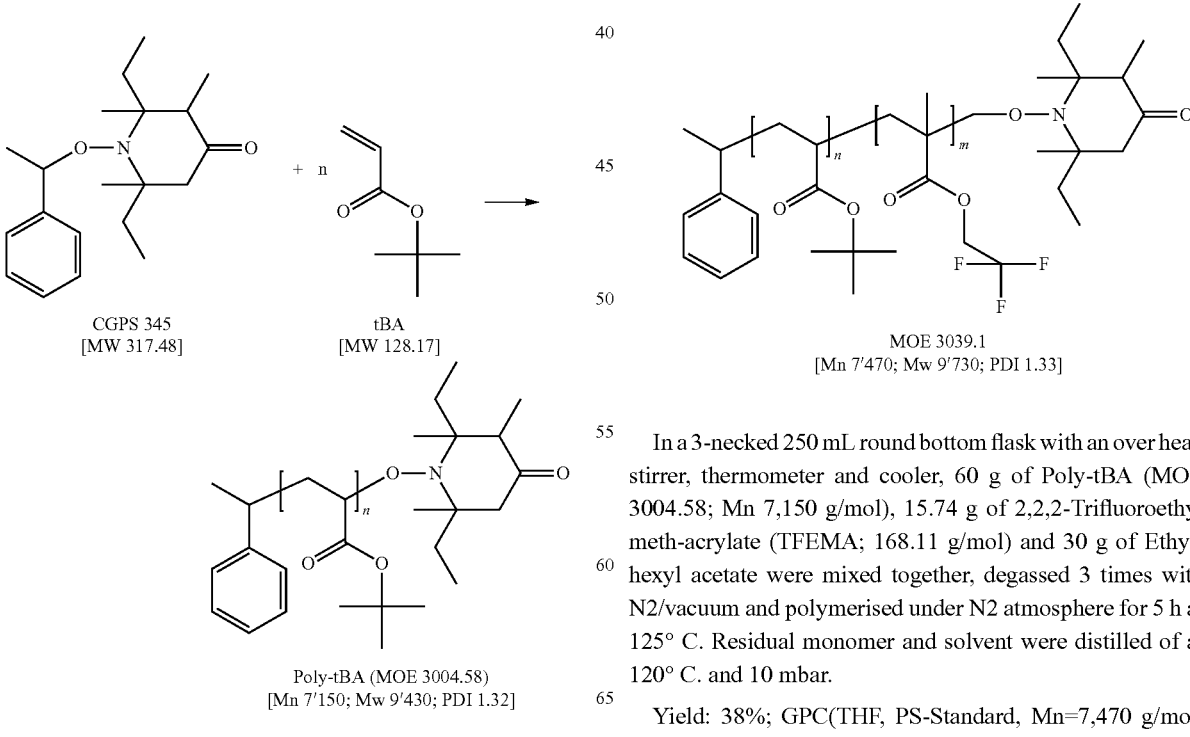

CGPS 345
[MW 317.48]

tBA
[MW 128.17]

MOE 3039.1
[Mn 7'470; Mw 9'730; PDI 1.33]

Poly-tBA (MOE 3004.58)
[Mn 7'150; Mw 9'430; PDI 1.32]

In a 3-necked 250 mL round bottom flask with an over head stirrer, thermometer and cooler, 60 g of Poly-tBA (MOE 3004.58; Mn 7,150 g/mol), 15.74 g of 2,2,2-Trifluoroethyl meth-acrylate (TFEMA; 168.11 g/mol) and 30 g of Ethylhexyl acetate were mixed together, degassed 3 times with N2/vacuum and polymerised under N2 atmosphere for 5 h at 125° C. Residual monomer and solvent were distilled of at 120° C. and 10 mbar.

Yield: 38%; GPC(THF, PS-Standard, Mn=7,470 g/mol; PD=1.33), solid.

EXAMPLE 5

Synthesis of a Linear Block-Copolymer of 2-Ethylhexyl acrylate (EHA) and 2,2,2-Trifluoroethyl methacrylate (TFEMA)—MOE 3049.4

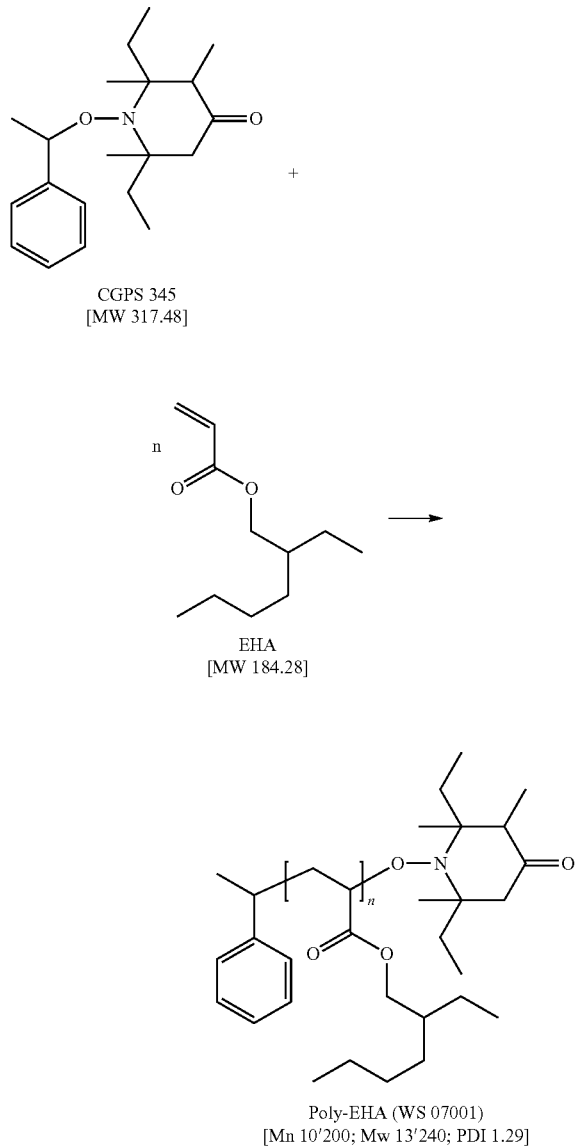

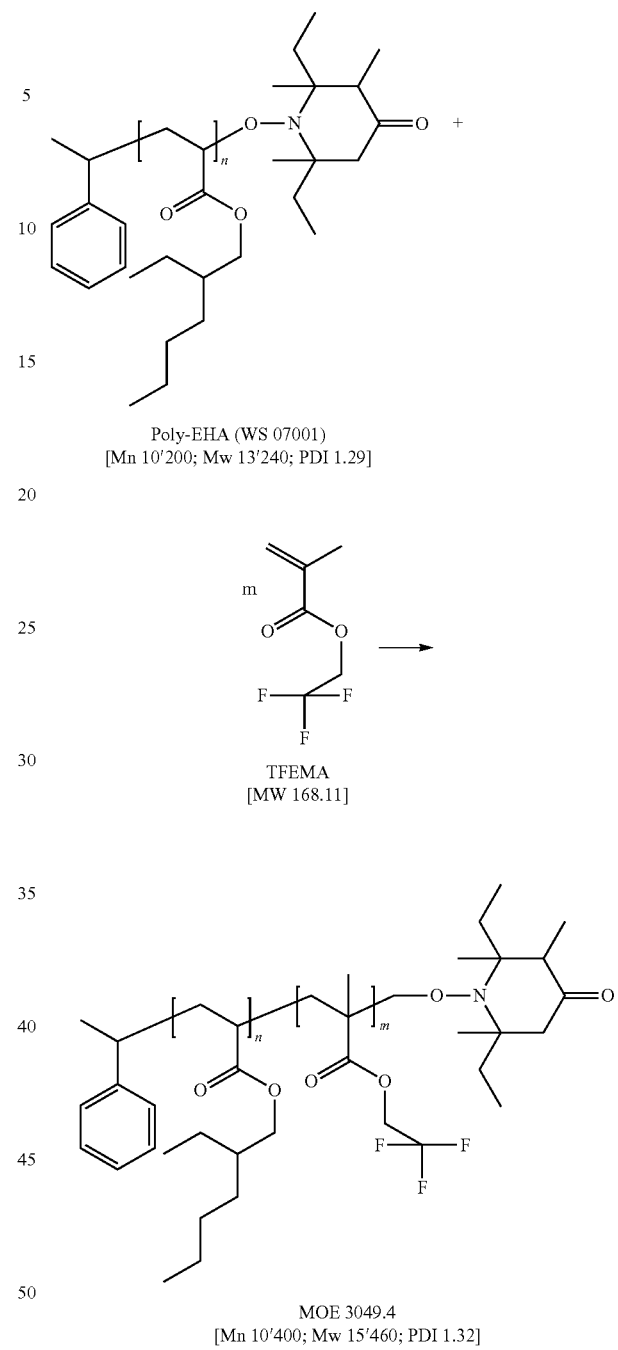

In a 5-necked 350 mL Sulfier flask with an over head stirrer, thermometer, cooler and septum, 250.0 g 2-Ethylhexyl acrylate (EHA, 184.28 g/mol) and 4.035 g of CGPS 345 (317.48 g/mol) were mixed together, degassed 3 times with N2/vacuum and polymerised under N2 for 6 h at 125° C. Residual monomer was distilled of at 105° C. and 20 mbar.

Yield: 48.9%; GPC(THF, PS-Standard, Mn=10,200 g/mol; PD=1.29), viscous liquid

In a 100 mL steel autoclave 30 g of Poly-EHA (WS 07001; Mn 10,200 g/mol) and 1.76 g of 2,2,2-Trifluoroethyl methacrylate (TFEMA; 168.11 g/mol) were mixed together, degassed 5 times with Argon/vacuum and polymerised for 4 h at 145° C. During this time the pressure in the autoclave didn't exceed 1.5 bar. Residual monomer was distilled of at 105° C. and 20 mbar.

Yield: 43%; GPC(THF, PS-Standard, Mn=10,400 g/mol; PD=1.32), viscous liquid

EXAMPLE 6

Synthesis of a Linear Copolymer of n-Butylacrylate (nBA) and 2,2,2-Trifluoroethyl meth-acrylate (TFEMA)—MOE 3048.8

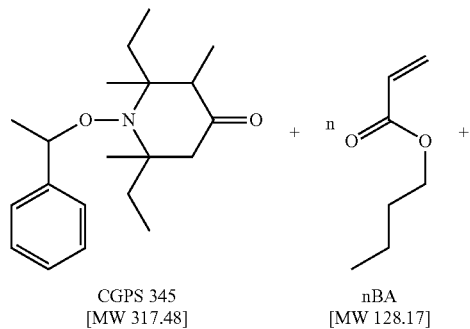

CGPS 345 [MW 317.48]      nBA [MW 128.17]

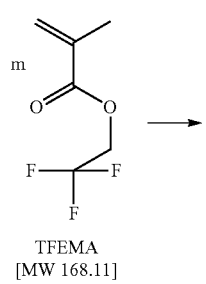

TFEMA [MW 168.11]

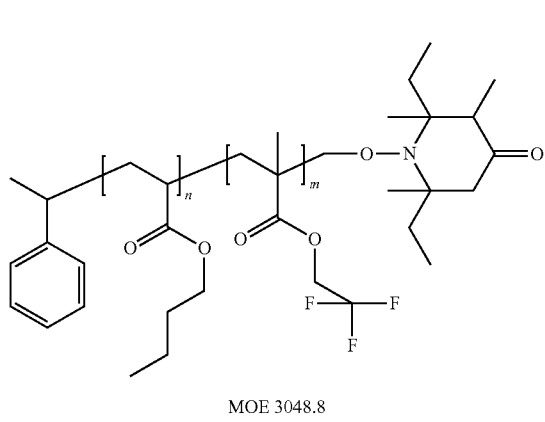

MOE 3048.8
[Mn 8'290; Mw 10'330; PDI 1.246]

In a 5-necked 750 mL Sulfier flask with an over head stirrer, thermometer, cooler and septum, 380.0 g n-Butylacrylate (nBA, 128.17 g/mol), 31.81 g 2,2,2-Trifluoroethyl meth-acrylate (TFEMA; 168.11 g/mol) and 6.95 g of CGPS 345 (317.48 g/mol) were mixed together, degassed 3 times with N2/vacuum and polymerised under N2 for 8 h at 135° C. Residual monomer was distilled of at 120° C. and 10 mbar.

Yield: 43%; GPC(THF, PS-Standard, Mn=8,290 g/mol; PD=1.246), viscous liquid

EXAMPLE 7

Synthesis of a Linear Copolymer of 2-Ethylhexyl acrylate (EHA) and 2,2,2-Trifluoroethyl meth-acrylate (TFEMA)—MOE 3049.13

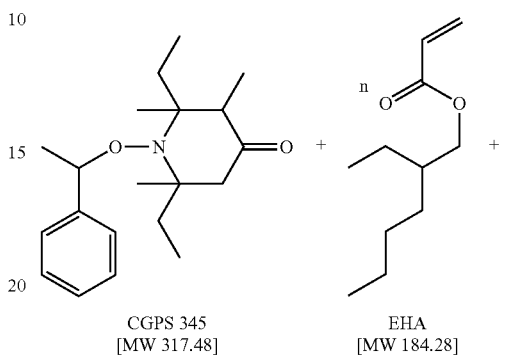

CGPS 345 [MW 317.48]      EHA [MW 184.28]

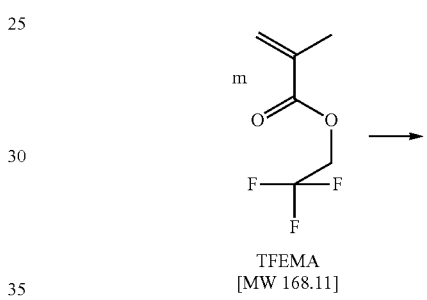

TFEMA [MW 168.11]

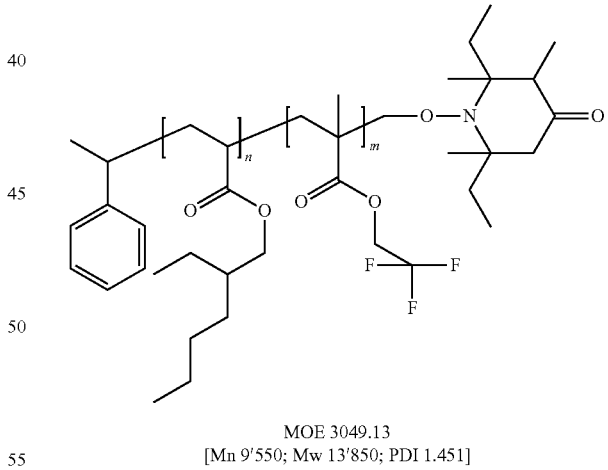

MOE 3049.13
[Mn 9'550; Mw 13'850; PDI 1.451]

In a 5-necked 750 mL Sulfier flask with an over head stirrer, thermometer, cooler and septum, 380.0 g 2-Ethylhexyl acrylate (EHA, 184.28 g/mol), 22.13 g 2,2,2-Trifluoroethyl meth-acrylate (TFEMA; 168.11 g/mol) and 4.84 g of CGPS 345 (317.48 g/mol) were mixed together, degassed 3 times with N2/vacuum and polymerised under N2 for 7 h at 135° C. Residual monomer was distilled of at 120° C. and 10 mbar.

Yield: 49%; GPC(THF, PS-Standard, Mn=9,550 g/mol; PD=1.451), viscous liquid

EXAMPLE 8

Synthesis of a Linear Block-Copolymer of acrylic acid, n-butylacrylate (nBA) and 2,2,2-trifluoroethylmethacrylate Made by Conventional Radical Polymerisation

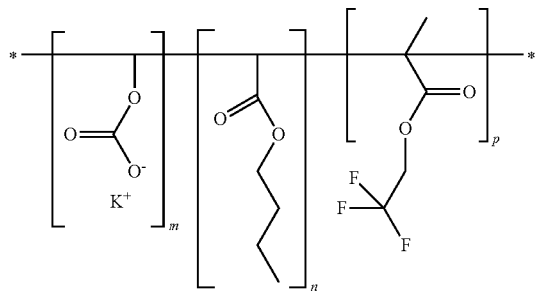

Intermediate A

Under nitrogen atmosphere maleic anhydride (10.40 g), Zonyl BA-L (40.60 g), Butyl acetate (5.00 g) and Tinstab BL-277 (catalytic) were placed in a reactor and heated to 90° C. After 3 hours isopropanol (44.00 g) was added.
Reference EFKA3666

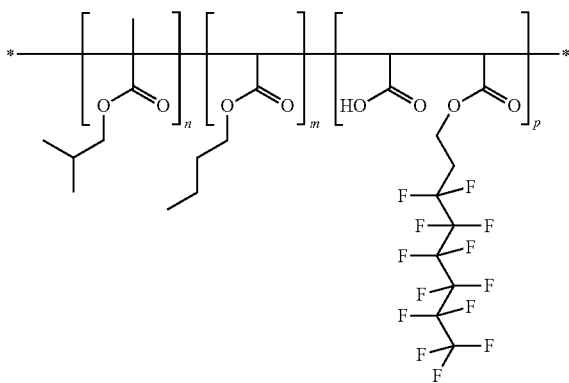

MPEG 350 (15.39 g) and intermediate A (22.04 g) were placed in a reactor under nitrogen atmosphere and heated to 120° C.

The premix consisting of n-butyl acrylate (17.15 g), acrylic acid (6.44 g) and tert-butyl peroxy-benzoate (2.81 g) was metered in over the course of 180 minutes. After addition the mixture was stirred at 120° C. for 1 hour. MPEG 350 (0.60 g) and tert-butyl peroxybenzoate (0.20 g) were added and the mixture was stirred at 120° C. for 2 hours. Isopropanol was distilled off under vacuum. The mixture was cooled to 60° C. and KOH aqueous solution (15%, 35.53 g) and water (8.66 g) were added.

EXAMPLE 9

MPEG 350 (17.63 g) was placed in a reactor under nitrogen atmosphere and heated to 120° C. The premix consisting of 2,2,2-trifluoroethylmethacrylate (9.93 g), n-butyl acrylate (13.72 g), acrylic acid (6.09 g) and tert-butyl peroxybenzoate (2.25 g) was metered in over the course of 100 minutes. After addition the mixture was stirred at 120° C. for 1 hour. MPEG 350 (0.60 g) and tert-butyl peroxybenzoate (0.20 g) were added and the mixture was stirred at 120° C. for 2 hours. The mixture was cooled to 60° C. and KOH aqueous solution (15%, 31.53 g) and water (6.93 g) were added.

Application Examples for Polymers Made Via NOX Mediated Controlled Polymerization

APPL. EXAMPLE 1

Levelling Performance of White Pigmented Powder Coatings Based on a Carboxyl-Functional Polyester and a Hydroxyalkylamide as a Hardener The powder coatings are prepared and their parameters are determined as described below. The formulations are given in Table 1.

TABLE 1

Formulations

| Components | Examples (amount in grams) | | |
| --- | --- | --- | --- |
| | No flow agent | Ex. 6 and Ex. 7 | Comparative Commercial agent Modaflow |
| 1. Crylcoat ® 2532[a] | 325 | 352 | 350 |
| 2. Primid ® XL 552[b] | 15 | 15 | 14 |
| 3. Ceridust ® 9615[c] | 1 | 1 | 1 |
| 4. Benzoin[d] | 2 | 2 | 2 |
| 5. Kronos ® 2160[e] | 125 | 125 | 125 |
| 6. Levelling agent | — | 5 | 8[f] |
| Total: | 495 | 500 | 500 |

[a]Crylcoat ® 2532 from UCB S.A., Drogenbos, Belgium
[b]Primid ® XL 552 from EMS, Domat, Switzerland
[c]Ceridust ® 9615 from Clariant AG, Muttenz, Switzerland
[d]Benzoin from Fluka AG
[e]Kronos ® 2160 from Kronos, Germany
[f]Modaflow ® P 3 from UCB Surface Specialties, USA, commercial levelling agent The components are mixed using a planetary stirrer. The mixture is then extruded on a prism extruder at 300 revolutions/minute at 110° C. and is rolled out. The powder coating composition is coarsely crushed using a bench cutter and is ground in a Retsch ZM-1 ultracentrifugal mill with a 0.75 mm annular-perforation screen at 15,000 revolutions/minute. Finally, the powder is passed through a 125 μm sieve on a centrifugal sieving machine having an average particle size of from 30 to 50 μm.

The finished powder coating composition is sprayed electrostatically to a coat thickness of 70 to 80 μm onto aluminium panels using an ESB-Wagner corona cup gun at 60 kV. The coated panels are cured in an electric oven at 180° C. for 10 minutes.

The following parameters are determined:
1) yellowness: b* ISO 7724 (ASTM D 2244). Large values of b* denote strong yellowing.
2) gloss @ 20° measured with a BYK Gardner haze-gloss in accordance with the manufacturer's suggested method of operation. High gloss values indicate high reflectance of the coating films.
3) DOI (BYK) with a BYK Gardner wave-scan DOI in accordance with the manufacturer's suggested method of operation. While a DOI value at zero is for a perfect diffusion, a DOI value of 100 means a perfect mirror image indicating a very smooth surface.
4) Longwave with a BYK Gardner wave-scan DOI in accordance with the manufacturer's suggested method of operation. Longwave values of lesser magnitude are indicative for coatings that are smoother in appearance.

TABLE 2

Results after curing for 10 minutes at 180° C.

| Flow agent | b* | Gloss @ 20° | Longwave | Shortwave | DOI |
|---|---|---|---|---|---|
| — | 4 | — | — | — | — |
| Example 6 | 5 | 86 | 55 | 39 | 83 |
| Example 7 | 5 | 83 | 55 | 41 | 83 |
| Modaflow P3 | 6 | 83 | 59 | 47 | 78 |

Tab. 2 shows that the flow agents according to Examples 6 and 7 show less yellowing and a smooth surface compared to a commercial levelling agent without fluor groups.

Leveling agents having perfluoro groups are even less suitable as the commercial leveling agent. This shows Tab. 2a TABLE 2a results after curing for 10 minutes at 200° C.

| Flow agent | b* | Gloss @ 20° | Longwave | Shortwave | DOI |
|---|---|---|---|---|---|
| Modaflow P3 | 4.5 | 85 | 44 | 34 | 84 |
| Perfluoro agent X | 5.5 | 77 | 63 | 56 | 74 |

Perfluoro agent X

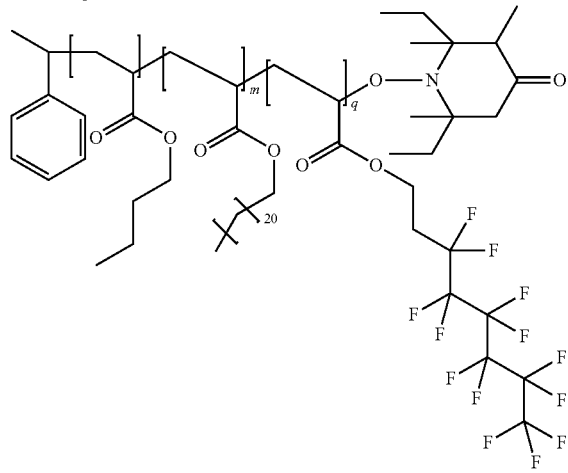

APPL. EXAMPLE 2

Slip Performance Tests in Stoving Enamel

Formulation:

| Raw material | Identity | Weight in g. |
|---|---|---|
| Vialkyd AC 451 | Synthetic Faty Acid Mod. Alkyd Resin | 78.5 |
| Maprenal MF 650 | Isobutylated melamine formaldehyde resin | 21.5 |
| Butylacetate | solvent | 10.0 |

The slip test was carried out on draw downs of the above stoving enamel formulations with three different additives based on Examples 1, 6 and 7 and EFKA 3666 as the reference.

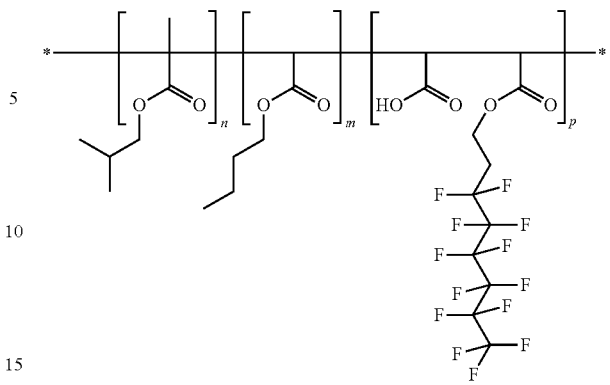

The stoving enamels were drawn on a glass plate with a 60 μm applicator. The coating was cured for 30 minutes at 135° C. after a flash off period of 20 minutes at room temperature. The coating was stabilized for 24 hours at room temperature before the measurement was done. The slip measurement was done with the Ray Ran microprocessor system. The machine pulls a 200 gram weight across the coating and determines the static and dynamic coefficient of friction in N.

| | Conc. | Blank | reference | Ex. 6 | Ex. 7 | Ex. 1 |
|---|---|---|---|---|---|---|
| Static (N) | 0.125% | 0.67 | 0.59 | 0.52 | 0.31 | 0.35 |
| Dynamic (N) | | 0.86 | 0.81 | 0.59 | 0.45 | 0.42 |
| Static (N) | 0.25% | 0.62 | 0.42 | 0.60 | 0.36 | 0.38 |
| Dynamic (N) | | 1.09 | 0.58 | 0.88 | 0.43 | 0.46 |
| Static (N) | 0.50% | 0.89 | 0.59 | 0.48 | 0.43 | 0.38 |
| Dynamic (N) | | 1.20 | 0.94 | 0.97 | 0.64 | 0.58 |

The results show that in general the performance of the new polymers was better than the reference.

APPL. EXAMPLE 3

Anticrater Test in Acrylic System

Formulation

| Raw material | Identity | Weight (g) |
|---|---|---|
| Synthalat A150 | Acrylic resin solution 60% in Xylene/MPA | 31.40 |
| Butylacetate | | 3.60 |
| RMPC | Laropal A81/EFKA-4330/ Heliogen blue L 7072D | 0.10 |
| Desmodur N75 | Isocyanate | 13.00 |
| Efka 2018 | Polymeric unsaturated compound | 1.65 |

Anticrater tests are indicators for the levelling performance of the additives. For this test the above acrylic 2 component system was used. To make the craters better visible a few drops of a RMPC (Laropal A81/EFKA-4330/Heliogen blue L 7072D) were added. Fifty grams of the material were made and directly divided in 5 times 10 gram. Directly after preparing this mixture respectively 0.25%, 0.50% and 1.00% of the additive (calculated on active material) were added to the 10 gram.

The samples were drawn down to PET with a 75 μm wire bar and were allowed to dry at room temperature for several hours before the coatings were judged.

Results

| Additive conc | Blank | Reference EFKA3666 | Ex. 6 | Ex. 7 | Ex. 1 |
|---|---|---|---|---|---|
| 0.25% | 6 | 5 | 3 | 2 | 2 |
| 0.50% | 6 | 4 | 3 | 2 | 2 |
| 1.00% | 7 | 2 | 2 | 1 | 1 |

8: a lot of craters
1: no craters

The tested materials performed better at lower levels compared to the reference. The examples 1 and 7 were the materials with the best performance.

APPL. EXAMPLE 4

Anticrater Test in 2 K Epoxy System

Formulation

| Raw material | Identity | Weight (g) |
|---|---|---|
| Epikote 1001 75X | Epoxy 75% in xylene | 23.93 |
| Xylene | | 3.18 |
| Butylglycol | | 1.92 |
| Isobutanol | | 0.96 |
| 2K Epoxy B component | | 20.40 |
| Efka 2021 | | 0.30 |
| RFPC | | 0.30 |

For this test the above epoxy 2 component system was used. To make the craters better visible a few drops of a RFPC (EFKA-4550/Heliogen blue L 7072D) were added. Fifty grams of the material was made and directly divided in 5 times 10 gram. Directly after preparing this mixture respectively 0.25%, 0.50% and 1.00% of the additive (calculated on active material) were added to the 10 gram.

The samples were drawn down to PET with a 75 μm wire bar and were allowed to dry at room temperature for several hours before the coatings were judged.

| Additive conc | Blank | Reference EFKA3666 | Ex. 6 | Ex. 7 | Ex. 1 |
|---|---|---|---|---|---|
| 0.25% | 6 | 6 | 2 | 2 | 3 |
| 0.50% | 8 | 1 | 1 | 2 | 2 |
| 1.00% | 8 | 1 | 1 | 2 | 2 |

8: a lot of craters
1: no craters

The tested materials perform better at lower levels compared to the reference. The example 6 was the material with the best performance.

Application Examples for Polymers Made by Conventional Radical Polymerization

APPL. EXAMPLE 5

Anticrater Tests of Aqueous Acrylic Emulsions

Formulations:

| | |
|---|---|
| 1) Joncryl 8052 (g) | 90.74 |
| 2) RFPC based on EFKA-4550 (g) | 0.91 |
| 3) Water (g) | 8.33 |
| 4) EFKA-2550 (g) | 0.02 (1 dr.) |
| 5) Total | 100.0 |

Mix 1 and 2 for 5 min. at 2000 rpm
Wait 5 min. to reduce foam
Mix 3 and 4 in formulation 15 min 2000 rpm Results

| | Blank | Ref. 0.2% | Ex. 8 0.2% | Ref. 0.4% | Ex. 8 0.4% | Ref. 0.5% | Ex. 8 0.5% |
|---|---|---|---|---|---|---|---|
| 1) Acrylic (g) | 10.0 | 10.0 | 10.0 | 10.0 | 10.0 | 10.0 | 10.0 |
| 2) Additive (g) | — | 0.02 | 0.02 | 0.04 | 0.04 | 0.05 | 0.05 |
| 3) Total | 10.0 | 10.02 | 10.02 | 10.04 | 10.04 | 10.05 | 10.05 |

Ref.: = EFKA3666

Application
Draw downs: 75 μm, Polyester film
Results Crater Test

| | Blank | Ref. 0.2% | Exp. 1 0.2% | Ref. 0.4% | Exp. 1 0.4% | Ref. 0.5% | Exp. 1 0.5% |
|---|---|---|---|---|---|---|---|
| 1) Craters | 8 | 2 | 2 | 1.5 | 2 | 1 | 1 |

Craters:
1: no craters
8: A lot of craters

Craters:
The results of the application test shows that 2,2,2-trifluoroethylmethacrylate as monomer gives the same results as slip and levelling agent as an additive with telomere alcohol as a monomer.

The invention claimed is:
1. A coating composition comprising:
   a) a film forming binder resin, and
   b) a copolymer made by controlled polymerisation or by radical polymerisation comprising a monomer ($M1_x$) selected from unsaturated monomers of the group of (meth)acrylates, styrenic monomers and (meth)acrylamides whereby the copolymer contains >30 wt % (meth)acrylates; and
   a monomer ($M2_y$) selected from $C_1$-$C_4$-fluoralkyl(meth)acrylates;
   x denotes the total number of monomers M1 within the structural element ($M1_x$): x>5 and
   y denotes the total number of monomers M2 within the structural element ($M2_y$): y>1.
2. A coating composition according to claim 1, wherein the copolymer b) is obtained by radical polymerisation by reacting M1 with M2 in the presence of a free radical initiator selected from inorganic or organic peroxides, hydroperoxides, persulfates and azo compounds.
3. A coating composition according to claim 1, wherein the copolymer b) is obtained by controlled polymerisation.
4. A coating composition according to claim 1, comprising
   a) film forming binder resin, and
   b) a copolymer made by nitroxide mediated controlled polymerisation having the structure:

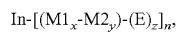

wherein
   M1 is selected from unsaturated monomers of the group of (meth)acrylates, styrenic monomers and (meth)acrylamides whereby the copolymer contains >30 wt % (meth) acrylates, and x denotes the total number of monomers M1 within the structural element $(M1_x)$: $x>5$, M2 is selected from $C_1$-$C_4$-fluoralkyl(meth)acrylates, y denotes the total number of monomers M2 within the structural element $(M2_y)$: $y>1$, In is an initiator fragment capable to initiate radical polymerisation, E is a group bearing at least one stable free nitroxyl radical, which is bound via the oxygen atom to the polymer or copolymer; or a group which results from a substitution or elimination reaction of the attached stable free nitroxyl radical;

$z=\geq 1$ and $n=1$ to 20.

5. A coating composition according to claim 4 wherein the copolymer b) is a linear copolymer of formula (I) wherein n is 1.

6. A coating composition according to claim 1, wherein M2 is selected from 2,2,2-trifluoroethyl (meth)acrylate, 2,2,3,3,3-pentafluoropopyl (meth)acrylate and 2,2,3,4,4,4-hexafluorobutyl (meth)acrylate.

7. A coating composition according to claim 1, wherein the initiator IN-E is a compound of formula A, B or O

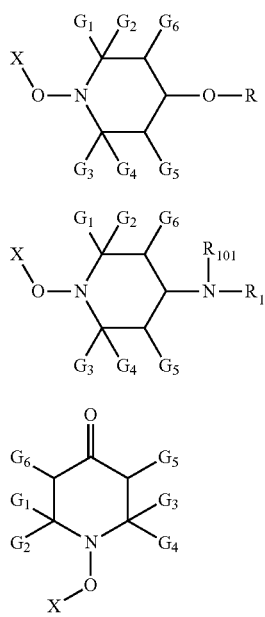

wherein

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$G_6$ is hydrogen, $G_5$ is hydrogen or $C_1$-$C_4$alkyl, $G_1$ and $G_3$ are methyl, $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, $(C_5$-$C_6$cycloalkyl$)_2CCN$, $(CH_3)_2CCN$,

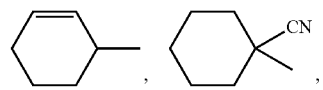

—$CH_2CH=CH_2$, $CH_3CH—CH=CH_2$ ($C_1$-$C_4$alkyl) $CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl and ($C_1$-$C_4$) alkyl-$CR_{20}$—C(O)—$NH_2$, wherein $R_{20}$ is hydrogen or ($C_1$-$C_4$)alkyl.

8. A coating composition according to claim 1 wherein the copolymer of formula (I) is obtained by b1) polymerization in the presence of an alkoxyamine initiator/regulator having the structural element

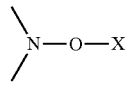

where

X is selected from the group consisting of

—$CH_2$-phenyl, $CH_3CH$-phenyl, $(CH_3)_2C$-phenyl, $(C_5$-$C_6$cycloalkyl$)_2CCN$, $(CH_3)_2CCN$,

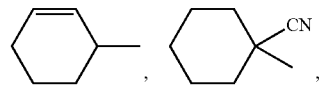

—$CH_2CH=CH_2$, $CH_3CH—CH=CH_2$ ($C_1$-$C_4$alkyl) $CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl and ($C_1$-$C_4$) alkyl-$CR_{20}$—C(O)—$NH_2$, wherein $R_{20}$ is hydrogen or ($C_1$-$C_4$)alkyl or by b2) polymerization in the presence of a stable nitroxyl free radical having the structural element

and a radical initiator.

9. A coating composition according to claim 1, comprising a) film forming binder resin, and b) a copolymer made by controlled ATRP polymerisation having the structure:

$$X-[(M1_x-M2_y)-(Y)_z]_n$$

wherein

M1 is selected from unsaturated monomers of the group of (meth)acrylates, styrenic monomers and (meth)acrylamides whereby the copolymer contains >30 wt % (meth) acrylates, and x denotes the total number of monomers M1 within the structural element $(M1_x)$: $x>5$,
M2 is selected from $C_1$-$C_4$-fluoralkyl(meth)acrylates,
y denotes the total number of monomers M2 within the structural element $(M2_y)$: $y>1$,
X is the initiator fragment starting the ATRP polymerisation reaction;
Y is Cl, Br or a group introduced by nucleophilic substitution of Cl or Br;
$z=\geq 1$ and
$n=1$ to 20.

* * * * *